(12) United States Patent
Verbrugghe

(10) Patent No.: US 10,293,671 B2
(45) Date of Patent: May 21, 2019

(54) PANEL-REINFORCEMENT SET FOR A PLASTIC TRUNK LID

(71) Applicant: FAURECIA BLOC AVANT, Nanterre (FR)

(72) Inventor: Jerome Verbrugghe, Eloie (FR)

(73) Assignee: AUTOMOTIVE EXTERIORS EUROPE, Lyons (FR)

( * ) Notice: Subject to any disclaimer, the term of this patent is extended or adjusted under 35 U.S.C. 154(b) by 389 days.

(21) Appl. No.: 15/159,035

(22) Filed: May 19, 2016

(65) Prior Publication Data

US 2016/0339771 A1  Nov. 24, 2016

(30) Foreign Application Priority Data

May 20, 2015 (FR) ...................................... 15 54529

(51) Int. Cl.
*B60J 10/80* (2016.01)
*B60J 1/00* (2006.01)
*B60J 1/18* (2006.01)
*B60J 5/10* (2006.01)
*B60J 10/34* (2016.01)
*B62D 25/12* (2006.01)

(52) U.S. Cl.
CPC ............... *B60J 10/80* (2016.02); *B60J 1/004* (2013.01); *B60J 1/18* (2013.01); *B60J 5/101* (2013.01); *B60J 5/107* (2013.01); *B60J 10/34* (2016.02); *B62D 25/12* (2013.01)

(58) Field of Classification Search
CPC ... B60J 10/80; B60J 10/34; B60J 1/004; B60J 5/101; B60J 1/18; B60J 5/107; B62D 25/12

USPC ............................................. 296/76, 56, 146.8
See application file for complete search history.

(56) References Cited

U.S. PATENT DOCUMENTS

| 4,822,098 A * | 4/1989 | Vogt ....................... B60J 5/101 |
| | | 296/146.5 |
| 2012/0248814 A1* | 10/2012 | Tsukiyama ............... B60J 5/101 |
| | | 296/146.8 |
| 2012/0306231 A1 | 12/2012 | Ginestet et al. |

FOREIGN PATENT DOCUMENTS

| EP | 2 502 770 A1 | 9/2012 |
| FR | 2 945 480 A1 | 11/2010 |
| JP | 2016060305 A * | 4/2016 ............ B60J 5/101 |
| WO | 2011/073544 A1 | 6/2011 |

OTHER PUBLICATIONS

French Search Report, dated Mar. 30, 2016, from corresponding French Application.

* cited by examiner

*Primary Examiner* — Jason S Morrow
*Assistant Examiner* — E Turner Hicks
(74) *Attorney, Agent, or Firm* — Young & Thompson

(57) ABSTRACT

A set intended to be part of a motor vehicle trunk lid includes: a panel and at least one reinforcement defining an opening, a first glue line intended to fasten a rear window of the trunk lid on the panel, the rear window defining a thickness direction, the reinforcement including a body, and an end extending along the first glue line, the end forming a flexible blade intended to be received in a housing formed by the panel and the rear window.

14 Claims, 2 Drawing Sheets

PANEL-REINFORCEMENT SET FOR A PLASTIC TRUNK LID

FIELD OF THE INVENTION

The present invention relates to a set intended to be part of a motor vehicle trunk lid.

BACKGROUND OF THE INVENTION

Typically, the panel of a trunk lid bears a rear window fastened on the panel by gluing. The gluing must be perfectly tight to prevent the intrusion of water through the trunk lid into the vehicle.

However, such a vehicle trunk lid is not fully satisfactory. In particular, a plastic panel for example resulting from molding shows rigidity problems at the lateral uprights of the trunk lid.

One skilled in the art has tried to offset this lack of rigidity of the trunk lid by using reinforcements at the lateral uprights. However, this modification has not made it possible to take to guarantee perfect sealing at the rear window, which is why the use of reinforcements was abandoned in favor of sealing the rear window.

BRIEF SUMMARY OF THE INVENTION

The present invention in particular aims to propose a set for reinforcing the panel of a trunk lid, further preserving satisfactory sealing between the rear window and the set.

To that end, the invention relates to a set intended to be part of a trunk lid for a motor vehicle, the set comprising:
a panel and at least one reinforcement defining an opening,
a first line of glue intended to fasten a rear window of the trunk lid on the panel, the rear window defining a thickness direction,
the reinforcement including a body, and an end extending along the first line of glue, the end forming a flexible blade intended to be received in a housing formed by the panel and the rear window.

Such a set has multiple advantages, which are summarized non-exhaustively below.

The set according to the invention makes it possible to stiffen the trunk lid of a vehicle, while allowing the sealing of the line of glue between the rear window and the panel and the reinforcement. The use of a reinforcement fastened on the panel also allows greater freedom for the design of the vehicle trunk lid.

Owing to the blade, a contact surface in the form of a baffle is formed between the housing of the panel and the reinforcement, which makes it possible to reduce the likelihood of intrusion of glue coming from the glue line between the panel and the reinforcement.

The set according to the invention may include one or more of the following features, considered alone or according to any technically possible combination(s):
the housing is formed partially by the panel, the panel including a notch partially defining the housing, the notch having a width in a direction perpendicular to the line of glue and the direction of the thickness, the width being greater than or equal to a width of the line of glue;
the notch is partly defined by a surface of the panel, the surface being substantially perpendicular to the thickness direction;
the body comprises a partially transverse stop surface along the first glue line, the stop surface forming an angle with the thickness direction comprised between 5° and 25°, preferably substantially equal to 15°;
the body of the reinforcement includes an alignment surface forming an angle with the thickness direction, the angle being comprised between 35° and 55°, preferably substantially equal to 45°;
the flexible blade of the reinforcement has a thickness in the thickness direction comprised between 1 and 3 mm, preferably about 1.3 mm;
the flexible blade defines a slit with the notch of the housing, the slit having a width along the first glue line comprised between 0.1 mm and 1 mm, preferably about 0.2 mm;
a layer of glue situated on an inner surface of the body of the reinforcement, the body including a rim protruding from the inner surface; and
the set further includes a second line of glue extending over the reinforcement and the panel, the panel including a part intended to be fastened by the second line of glue on a cover panel of the motor vehicle.

The invention also relates to a motor vehicle including a trunk lid comprising a set as described above.

BRIEF DESCRIPTION OF THE DRAWINGS

The invention will be better understood upon reading the following description, provided solely as an example, and in reference to the appended drawings, in which.

DETAILED DESCRIPTION OF THE INVENTION

Figure 1:
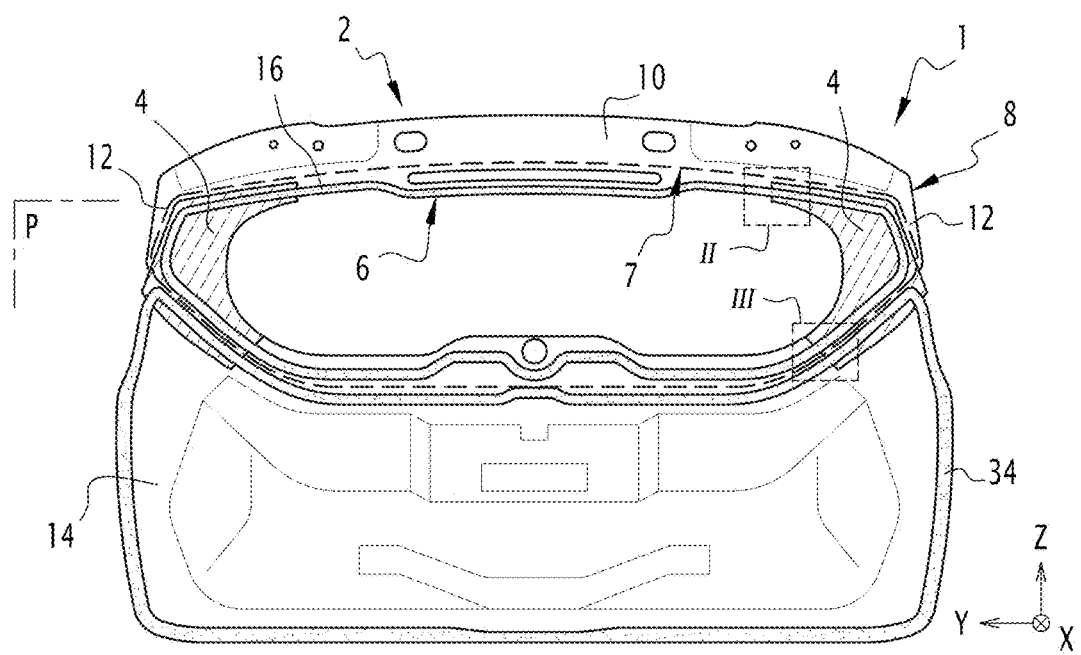
FIG. 1 is a rear view of a set in a normal driving direction of a motor vehicle according to one embodiment of the invention.
Figures 2, 3:
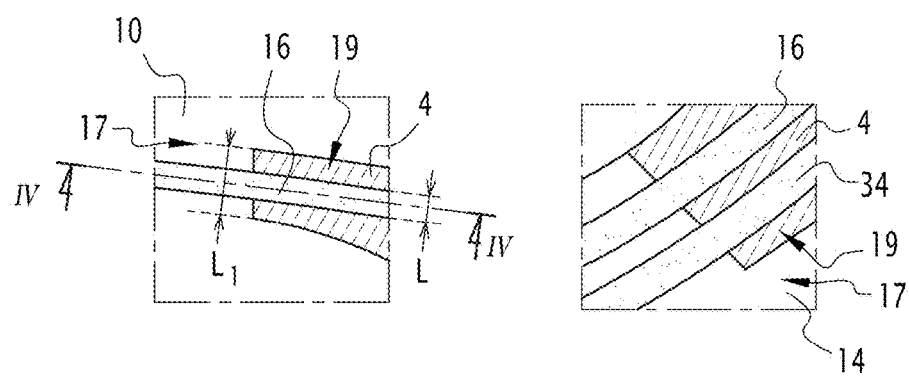
FIG. 2 is a detailed view of a first part of the set shown in FIG. 1.
FIG. 3 is a detailed view of a second part of the set shown in FIG. 1.

FIG. 1 shows a set 1 intended to be part of a trunk lid of a motor vehicle (not shown).

In the present description, the terms "upper" or "top" and "lower" or "bottom" are defined relative to a vehicle with a trunk lid in the closed position, except when they have a local meaning. An orthogonal plane of reference is shown in FIG. 1, in which the "upper" or "vertical" direction is designated by reference Z. Furthermore, the terms "front" and "rear" are defined relative to the movement direction of the vehicle in the direction designated by the reference X. The "lateral" or "horizontal" parts of the set 1 are relative to the reference Y. The terms "inner" and "outer" are defined relative to a volume included in the motor vehicle, except when they have a local meaning.

The set 1 shown in FIG. 1 includes a panel 2 and at least one reinforcement 4 together defining an opening 6 intended to be covered by a rear window 7 of the trunk lid.

Generally, this opening 6 is located in the upper part of the panel 2. Thus, the panel 2 defines a frame 8 forming at least part of the opening 6.

The frame 8 of the panel 2 comprises an upper upright 10 that extends substantially in the horizontal direction Y, at least two opposite uprights 12 that extend substantially in the vertical direction Z laterally on the panel 2, and a lower part 14 extending substantially along a horizontal direction Y.

It is possible to produce the frame 8 in another form, in particular with more than two opposite uprights 12.

The panel 2 can extend in a vertical plane defined by the directions Y and Z, or be inclined relative to said vertical plane. Likewise, it is possible to consider that the panel 2 has a bent shape, i.e., not planar.

In the example shown in FIG. 1, the set 1 is intended to be fixed by the upper upright 10 on a chassis of the motor vehicle. However, it is possible to choose other fastening points of the panel 2 on the chassis of the motor vehicle.

Likewise, it is possible to consider producing a set 1 in two parts, for example, for trunk lids fastened by the two opposite uprights on the chassis of the vehicle.

At least a first line of glue 16 extends around the opening 6 over at least part of an outer surface 17 of the panel 2 and at least part of an outer surface 19 of the reinforcement 4, as shown in FIGS. 1 to 4. This line of glue 16 is preferably continuous. The line of glue 16 is intended to fasten the rear window 7 on the set 1 tightly. As a result, the line of glue 16 extends substantially along a bent curve P parallel to an inner surface 9 of the rear window 7.

The line of glue 16 advantageously has a width L parallel to the rear window 7 of 22 mm in view. The line of glue 16 has a thickness perpendicular to the rear window 7 of 5 mm. The line of glue 16 is formed by a glue having sealing and tensile adhesion strength properties varying depending on the builders' specifications.

The panel 2 is made from a plastic material by molding, for example from polypropylene, for example of the PP TD 30, PP TD 40 or PP TD 50 type. It is also possible to consider using a thermosetting plastic, composite materials or carbon to form the frame 8 of the panel 2.

The panel 2 and the rear window 7 together form a housing 18.

The housing 18 includes a rim 11 on its periphery.

Preferably, the housing 18 is partially formed by the panel 2 at the opposite uprights 12 of the frame 8.

The opposite uprights 12 of the panel 2 can have a cross-section, perpendicular to the first line of glue 16, in a U shape. In this case, the housing 18 also includes a cross-section, perpendicular to the first line of glue 16, in a U shape.

However, it is possible to produce shapes other than a U shape, for example, a shape able to be produced by one skilled in the art. The U shape in particular makes it possible to increase the rigidity of the opposite uprights 12.

The opposite uprights 12 are advantageously formed by molding.

Figure 4:
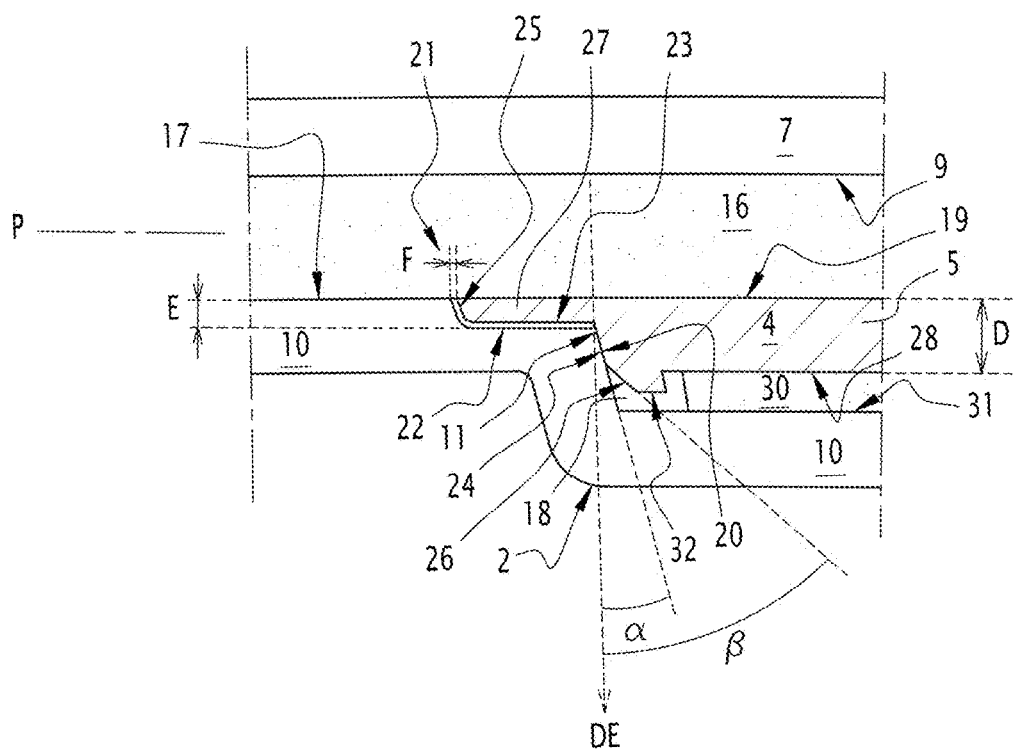
FIG. 4 is a diagrammatic cross-sectional view of the first part of the set shown in FIG. 2.

As shown in FIG. 4, the housing 18 includes a bearing surface 20 extending along a plane inclined at a thickness direction DE. The thickness direction DE is substantially perpendicular to the rare window 7. Thus, the bearing surface 20 locally defines an angle comprised between 5° and 25°, preferably 15° with the thickness direction DE.

The bearing surface 20 is intended to receive at least part of the reinforcement 4 by bearing. Thus, the reinforcement 4 is stabilized in the housing 18 and/or the play of the reinforcement in a direction parallel to the bent curve P is reduced.

The bearing surface 20 of the housing 18 can include a rough surface and/or ribs extending perpendicular to the thickness direction DE, shown in FIG. 4.

The panel 2 includes a notch 22 partially defining the housing 18.

This notch 22 includes at least one surface of the panel 2 extending in a plane perpendicular to the thickness direction DE.

The notch 22 has a width L1 in a direction perpendicular to the line of glue 16 and to the thickness direction DE greater than or equal to the width L of the line of glue 16.

In the example shown in FIG. 4, the notch 22 includes a surface 23 extending parallel to the bent curve P, and a curved surface 25, not perpendicular to the thickness direction DE, and connecting the outer surface 17 of the panel 2 with the surface 23 of the panel 2.

Advantageously, the notch 22 is made on the rim 11 of the housing 18. The notch 22 is intended to receive a flexible blade 27 of the reinforcement 4 and consequently has a shape complementary to that of the flexible blade 27. The flexible blade 27 will be described later.

The reinforcement 4 can be manufactured from the same material as the panel, or from another material having a high rigidity.

The reinforcement 4 includes a body 5 with a shape substantially complementary to that of the housing 18 defined by the panel 2 and the rear window 7.

The body 5 has a thickness D in the thickness direction DE comprised between 2.5 and 3.5 mm, preferably 3 mm.

The body 5 of the reinforcement 4 includes at least one partially transverse stop surface 24 along the first line of glue 16.

The stop surface 24 extends in a plane that is substantially inclined relative to the thickness direction DE. The stop surface 24 is intended to abut against the bearing surface 20 of the housing 18. Consequently, the stop surface 24 is advantageously in planar contact with the bearing surface 20 of the housing 18 of the panel 2. Furthermore, the stop surface 24 of the body 5 defines an angle a comprised between 5° and 25°, preferably of 15°, with the thickness direction DE.

The body 5 of the reinforcement 4 can include two opposite stop surfaces 24 cooperating with the two bearing surfaces 20 of the housing 18 of the panel 2. In this way, the reinforcement 4 is gripped in the housing 18. In this case, the two stop surfaces 24 give the reinforcement 4 a locally cuneiform shape. This shape allows gripping of the reinforcement 4 in the housing 18 of the upright 12.

Furthermore, the stop surface 24 can include a rough surface and/or ribs extending perpendicular to the thickness direction DE in the housing 18. Thus, the reinforcement 4 is held firmly in the housing 18.

The thickness direction DE of the reinforcement 4 is locally, at the housing 18, substantially perpendicular to the bent curve P.

The reinforcement 4 may optionally include an alignment surface 26 adjacent to the stop surface 24 in the thickness direction DE of the reinforcement 4. This alignment surface 26 of the reinforcement 4, shown in FIG. 4, defines an acute angle with the bearing surface 20 of the housing 18. More specifically, in the illustrated example, the alignment surface forms an angle β with the thickness direction D comprised between 35° and 55°, preferably of 45°.

The alignment surface 26 makes it possible to align the reinforcement 4 during its insertion in the housing 18. Thus, the insertion of the reinforcement 4 in the housing 18 is facilitated during the assembly of the reinforcement 4 and the panel 2. This assembly will be described later.

The reinforcement 4 includes an inner surface 28, substantially perpendicular to the thickness direction DE. The inner surface 28 is turned along the thickness direction DE toward the inside of the motor vehicle.

The reinforcement 4 is for example fastened on the panel 2 by a layer of glue 30. In this case, the layer of glue 30 is situated between a bottom surface 31 of the housing 18 and the inner surface 28 of the body 5 of the panel 2. Thus, the inner surface 28 of the reinforcement 4 is connected by the layer of glue 30 to the bottom surface 31 of the housing 18.

In the example illustrated in FIG. 4, the body 5 of the reinforcement 4 includes a rim 32 protruding relative to the inner surface 28. This results in blocking a movement past the inner surface 28 of the layer of glue 30.

Alternatively, the reinforcement 4 is for example fastened on the panel 2 by another chemical or mechanical fastening method, advantageously by welding, riveting or screwing.

Advantageously, the flexible blade 27 of the reinforcement 4 extends one end of the body 5 of the reinforcement 4 along the first line of glue 16. The flexible blade 27 is situated at least in a zone of the reinforcement 4 situated under the first line of glue 16.

Alternatively, the flexible blade 27 can also extend over the entire edge of the reinforcement 4.

The flexible blade 27 is intended to cooperate with the notch 22 of the panel 2. It is therefore complementary to the notch 22.

The flexible blade 27 has a thickness E smaller than the thickness D of the body 5. Thus, the flexible blade 27 is more flexible than the body 5 of the reinforcement 4.

The thickness E of the flexible blade 27 is for example comprised between 1 and 3 mm, preferably about 1.3 mm. The thickness E of the flexible blade 27 depends on the material of the reinforcement 4. The thickness E is chosen as a function of the desired flexibility. The smaller the thickness E is, the more the flexibility of the flexible blade 27 increases.

The blade 27 defines a slit 21 with the notch 22 of the panel 2. The shape of the slit 21 is defined by the notch 22 and the blade 20. The slit 21 has a width F along the first line of glue 16 comprised between 0.1 and 1 mm, preferably approximately 0.2 mm.

Thus, the intrusion of the glue from the line of glue 16 in the slit 21 is minimized. In this way, the glue consumption of the line of glue 16 is minimized.

Owing to the flexible blade 27, it is possible to create a local alignment along the thickness direction DE of the reinforcement 4. In this way, the outer surface 19 of the reinforcement 4 and the outer surface 17 of the panel 2 form a junction between the notch 22 and the blade 27 situated in a same plane perpendicular to the thickness direction DE.

Consequently, the thickness of the line of glue 16 is homogenous and the sealing of the line of glue 16 is maximized.

The set 1 can be situated below a second line of glue 34, or several lines of glue.

The second line of glue 34 extends primarily in the part 14 of the panel 2. For example, it extends over the lower periphery of the panel 2.

The line of glue 34 allows the fastening of a cover panel of the motor vehicle, not shown, covering the set 1 at least partially.

This cover panel of the motor vehicle can for example be made from plastic. According to one alternative, the cover panel of the motor vehicle is made from a metal material or carbon.

Everything that has been described above regarding the first line of glue 16 applies in the same way to the second line of glue 34. In particular, the description regarding a first interface between the panel 2 and the reinforcement 4 locally covered by the first line of glue 16 to bear the rear window 7 applies in the same way to a second interface between the panel 2 and the reinforcement 4 locally covered by the second line of glue 34 to bear the cover panel of the motor vehicle.

In one particular embodiment (not shown), the reinforcement 4 is made in two or more parts. Thus, the shape freedom and style freedom of the opening 6 defined by the set 1 is increased. However, a reinforcement formed from a single part provides better rigidity to the trunk lid than a reinforcement formed from several parts.

The set 1 makes it possible to simplify the tooling for the manufacture of the panel 1, for example because it is not necessary to add movements in the tooling.

The assembly of the set 1 will now be described.

Initially, the panel 2 is provided. Next, a layer of glue 30 is applied on the bottom surface 31 of the housing 18. Alternatively, the layer of glue 30 is applied on the lower surface 28 of the reinforcement 4.

Afterwards, at least one reinforcement 4 is inserted in the housing 18 with its lower surface 28 across from the surface of the bottom 31 of the housing 18. At the same time, the blade 27 of the reinforcement 4 is inserted in the notch 22 of the panel 2.

During the insertion of the reinforcement 4 in the notch 22, the alignment surface 26 of the reinforcement 4 can come into contact with the rim 11 of the housing 18. In this case, the alignment surface 26 favors the alignment of the reinforcement along the first line of glue 16. Thus, when a force is exerted on the reinforcement 4 in a direction parallel to the thickness direction DE, the reinforcement aligns automatically in the housing 18 owing to the alignment surface 26.

The flexible blade 27 makes it possible to decrease the depth in the direction of the thickness DE when the reinforcement 4 and the panel 2 come alongside one another.

Next, a first line of glue 16 is applied on the reinforcement 4 and the panel 2. Advantageously, this first line of glue 16 extends continuously around the opening 6.

Owing to the slit 21, the glue from the line of glue 16 practically not infiltrate at all between the flexible blade 27 and the panel 2.

The rear window 7 is applied by pressing of its inner surface 9 on the first line of glue 16 to be fixed on the panel 2 and the reinforcement 4.

During this pressing, the flexible blade 27 can deform along the thickness direction DE. Thus, the thickness of the line of glue is substantially homogenous in the thickness direction DE along the line of glue 16.

After the fastening of the rear window 7, a second line of glue 34 is optionally applied on the reinforcement 4 and the part 14 of the panel 2. This second line of glue 34 can for example include the same thickness and width as the first line of glue 16. The second line of glue 34 extends partially to the edge of the part 14 of the panel 2.

Lastly, a cover panel of a motor vehicle (not shown) is fastened by the second line of glue 34 on the assembly 1. This cover panel of a motor vehicle is preferably made from plastic, but can also for example be made from metal or carbon.

In one alternative, the second line of glue 34 is applied before the fastening of the rear window 7 on the first line of glue 16.

The sealing between the rear window 7 and/or the cover panel of a motor vehicle and the panel 2 and the reinforcement 4 is guaranteed owing to the flexible blade 27.

The outer surface 17 of the panel and the outer surface 19 of the reinforcement are aligned at the slit 21 in a local plane perpendicular to the thickness direction DE. This alignment guarantees a homogenous thickness of the line of glue 16, at least locally at the slit 21.

Everything that has been said regarding the sealing between the rear window 7 and the panel 2 and the reinforcement 4 applies in the same way to the cover panel of a motor vehicle and the panel 2 and the reinforcement 4.

If the body 5 of the reinforcement 4 is slightly offset in the thickness direction DE, for example by +/−1 mm, the flexibility of the flexible blade 27 makes it possible to correct this offset so that the upper surface 19 of the reinforcement and the outer surface 17 of the panel 2 remain aligned at the slit 21. Thus, the thickness of the first and/or second line of glue remains homogenous at the slit 21.

The invention claimed is:

1. A set intended to be part of a motor vehicle trunk lid, the set comprising:
    a panel and at least one reinforcement defining an opening, and
    a first glue line intended to fasten a rear window of the trunk lid on the panel, the rear window defining a thickness direction,
the reinforcement including a body, and an end extending along the first glue line, the end forming a flexible blade intended to be received in a housing formed by the panel and the rear window.

2. The set according to claim 1, wherein the housing is formed partially by the panel, the panel including a notch partially defining the housing, the notch having a width in a direction perpendicular to the first glue line and the direction of the thickness, the width being greater than or equal to a width of the first glue line.

3. The set according to claim 2, wherein the notch is partly defined by a surface of the panel, the surface being substantially perpendicular to the thickness direction.

4. The set according to claim 1, wherein the body comprises a stop surface partially transverse along the first glue line, the stop surface forming an angle with the thickness direction comprised between 5° and 25°.

5. The set according to claim 1, wherein the body of the reinforcement includes an alignment surface forming an angle with the thickness direction, the angle being comprised between 35° and 55°.

6. The set according to claim 1, wherein the flexible blade of the reinforcement has a thickness in the thickness direction comprised between 1 and 3 mm.

7. The set according to claim 1, wherein the flexible blade defines a slit with the notch of the housing, the slit having a width along the first glue line comprised between 0.1 mm and 1 mm.

8. The set according to claim 1, comprising a layer of glue situated on an inner surface of the body of the reinforcement, the body including a rim protruding from the inner surface.

9. The set according to claim 1, wherein the set further includes a second glue line extending over the reinforcement and the panel, the panel including a part intended to be fastened by the second glue line on a cover panel of the motor vehicle.

10. A motor vehicle including a trunk lid comprising a set according to claim 1.

11. The set according to claim 1, wherein the body comprises a stop surface partially transverse along the first glue line, the stop surface forming an angle with the thickness direction equal to 15°.

12. The set according to claim 1, wherein the body of the reinforcement includes an alignment surface forming an angle with the thickness direction, the angle being equal to 45°.

13. The set according to claim 1, wherein the flexible blade of the reinforcement has a thickness in the thickness direction about 1.3 mm.

14. The set according to claim 1, wherein the flexible blade defines a slit with the notch of the housing, the slit having a width along the first glue line about 0.2 mm.

* * * * *